United States Patent [19]

Pendergrast

[11] 3,839,007

[45] Oct. 1, 1974

[54] METHOD OF FERTILIZATION WITH SLOW RELEASE PHOSPHATE PARTICLES

[75] Inventor: Robert A. Pendergrast, Atlanta, Ga.

[73] Assignee: United States Steel Corporation, Pittsburgh, Pa.

[22] Filed: Oct. 29, 1973

[21] Appl. No.: 410,664

Related U.S. Application Data

[63] Continuation-in-part of Ser. No. 202,012, Nov. 24, 1971, abandoned.

[52] U.S. Cl. ................................................. 71/41
[51] Int. Cl. ............................................. C05b 1/00
[58] Field of Search ........................................ 71/41

[56] References Cited
UNITED STATES PATENTS
3,364,008  1/1968  Hollingsworth et al............ 71/41 X

*Primary Examiner*—Samih N. Zaharna
*Assistant Examiner*—Richard Barnes
*Attorney, Agent, or Firm*—Arthur J. Greif

[57] ABSTRACT

A method for the fertilization of soil with slow release particles of a size range of −4+28 mesh. The particles are prepared by the partial acidulation of rock phosphate granules with phosphoric acid. The method is of particular importance in fertilization by air, since it overcomes the problems associated with the use of conventional slow release particles which are generally finer than 100 mesh.

6 Claims, No Drawings

METHOD OF FERTILIZATION WITH SLOW RELEASE PHOSPHATE PARTICLES

This Application is a continuation-in-part of application Ser. No. 202,012, filed Nov. 24, 1971 now abandoned.

Phosphate ore is composed predominantly of fluorapatite $3Ca_3(PO_4)_2.CaF_2$. The majority of the phosphate in this ore is classified as unavailable phosphate for plant growth as determined by the test procedures of the Association of Official Analytical Chemists (A.O.A.C., Analytical Methods 2.041 – 2.047 Official Methods of Analysis of the A.O.A.C., 11th Ed., 1970, pp. 15–16). By these procedures, phosphates not taken into solution by neutral ammonium citrate are classified as unavailable whereas those which dissolve in the neutral ammonium citrate solution are classified as available.

Trade usage classifies phosphate ore by its content of tricalcium phosphate $Ca_3(PO_4)_2$, or bone phosphate of lime (BPL). Pure fluorapatite would therefore be approximately 86 BPL. Due to the presence of argilaceous, carbonate, and silicate minerals associated with deposits of rock phosphate, the actual BPL content of beneficiated phosphate ore is in the range of 60 – 78 percent with the higher BPL deposits becoming increasingly scarce.

By beneficiation and mineral separation techniques, the ore may be separated into various grades according to its intended use. It is customary to use the highest grade rock to make superphosphates, either normal superphosphate or triple superphosphate. Lower grades of phosphate rock are used in the production of phosphoric acid by the wet process. $3Ca_3(PO_4)_2.CaF_2 + 10H_2SO_4 \xrightarrow{20H_2O} 6H_3PO_4 + 10[CaSO_4.2H_2O] + 2HF$ In this process the crude phosphoric acid produced is separated from the gypsum and subjected to concentration during and after which operation a sludge material separates from the acid solution. The quantity of sludge will vary depending upon the level and ratio of impurities in the phosphate rock and upon various operating conditions. To a limited degree, this acid sludge material may be consumed in the manufacture of triple superphosphate. However, if too much is included the resulting triple superphosphate is hygroscopic, somewhat plastic, and lower in grade than the standard 46 percent available $P_2O_5$ material. Further, an overabundance of sludge can create an economic burden and a potential disposal problem for wet process phosphoric acid producers.

Acidulation techniques are performed for the purpose of converting as much as possible of the $P_2O_5$ in fluorapatite to a form which meets the definition of availability, that is solubility in neutral ammonium citrate solution. In untreated native Florida phosphate rock about 5–10 percent of the total $P_2O_5$ present would be available as determined by the citrate solubility test; however, after proper acidulation, upwards of 99 percent may be classified as available.

Nonetheless and surprisingly in view of the low phosphate availability of untreated rock, large amounts of finely pulverized untreated phosphate rock are used annually to provide phosphate nutrient by direct application to the soil. All direct application use of phosphate rock is in a finely pulverized form, i.e., usually 90 percent or more will pass through a 100 mesh screen. Such highly pulverant form is necessary because although the phosphate value in the rock is only sparingly available when measured by the Official Analytical Methods, the pulverant form does in fact become available to growing plants when subjected to the actions of soil solutions, to an active soil bacterial population, and/or to the exudates from plant root systems, particularly in slightly acidic soils. Since the rate at which the $P_2O_5$ in phosphate rock is made available by soil reactions is a function of surface area, and the more finely pulverulant rock will present a larger area per unit weight than a less finely pulverulant rock, it follows that finely pulverulant rock will degrade to an available phosphate form more quickly.

There are however certain inherent difficulties in the application of very finely divided solids to the soil, namely, the inability to achieve uniform rates of application due to bridging in the hoppers of mechanical equipment, wind-borne dust being carried away or the inability of a mechanical spreader to create a wide swathe with uniform trajectory without creating even greater clouds of wind-borne dust. In one specific application where native rock phosphate has particular appeal, that of forest fertilization, large areas are covered by aerial application which is totally impracticable with a finely ground material. Thus, there is an obvious need for a low cost phosphatic material useful as a fertilizer which can be suitable for aerial application. Accordingly, it is an object of this invention to provide a granular product comprising primarily rock phosphate which gives the same growth response when supplied as a phosphate source to growing plants as does finely ground rock phosphate, thus overcoming the disadvantage inherent in the application of a dusty material while retaining the advantages of untreated phosphate rock, namely, simplicity of processing and low cost as compared to conventional phosphate chemical fertilizers. It is a further object of this invention to provide a use for the acid sludge formed in wet process phosphoric acid.

In the instant invention, phosphate nutrients are applied to soils through the direct application of slow release fertilizer particles, substantially all of which are within the size range −4+28, i.e. no more than 10 percent by weight of the particles falling outside the designated range. The slow release particles are produced by contacting rock phosphate granules with a phosphoric acid containing material to an extent that the outer portion of the phosphate rock granule reacts with the phosphoric acid to produce an available phosphatic material, while the inner core portion of the granule remains in an unreacted, phosphate unavailable state. There is no precise boundary surface between these two portions, rather, a layer of partially acidulated phosphatic material intervenes. After contact with the phosphoric acid, the granule is dried and may be used directly. In a preferred embodiment of the invention, the phosphate granule is recycled one or more times to the acid contact stage.

The phosphatic raw material can be that fraction of commercial phosphate rock product known as "medium pebble", this being a mixture of irregularly shaped rock particles generally in the −4+16 mesh size range. However, rock phosphate granules in the size range −4+28 mesh from any source can also be used. For the sake of appearance and uniformity, granules primarily in the −8+20 mesh size range are preferred. Granules larger than desired may be crushed and rescreened. The presence of a substantial quantity of granules finer than 28 mesh, up to about 20 percent, does not present an impediment to the operability of the process. In the acidulation step, the smaller granules tend to lump together or adhere to the larger granules. The BPL content of the pebble is generally in the range of from about 60 to about 70. About 5 to about 10 percent of this phosphate is classified as "available phosphate" according to A.O.A.C. Analytical Methods 2.041 – 2.047. However, the process is not limited to these BPL or availability levels and granules having a higher or lower BPL level or greater or lesser availability is also suitable for use. In terms of $P_2O_5$ content, it is preferable to use granules with a $P_2O_5$ content of about 25 – 32 percent. Where the bulk of the phosphatic granules are considerably smaller than 28 mesh, some difficulty from agglomeration may be experienced, the wetted fines tending to cement together the coarser particles. Where the bulk of the phosphatic particles are of a size considerably larger than 4 mesh, the kernel of material not affected by the treatment of my invention is so large that the time required for soil conditions to render the phosphate content usable by plants is too long to be of practical use. It is therefore preferable that not more than about 5 percent of the granules be of a size greater than 4 mesh.

The granular phosphatic raw material is contacted with phosphoric acid in an amount equal to from about 5 to about 20 weight percent of the raw material, preferably from about 6 to about 15 weight percent. The amount of phosphoric acid used may also be expressed in terms of the amount theoretically required for complete acidulation of the raw material to monocalcium phosphate. From about 2.5 to about 10, preferably from about 5 to about 10 percent of the acid theoretically required for complete acidulation to monocalcium phosphate is used. The contact must be sufficient to significantly upgrade (i.e., an increase of greater than 50 percent) the amount of $P_2O_5$ which is "available phosphate" and thereby produce a final product having from about 15 to about 45 percent of the total $P_2O_5$ in citrate soluble form. Preferably, from about 6 to about 20 percent of the total $P_2O_5$ will be in water soluble form, as well. The purity of the acid used may be quite low and still be usable. Thus, in the interest of economy the acid sludge that forms during and after the digestion of phosphate rock may be used. Higher purity acids may of course also be used. A wide variation in the proportion of phosphate to acid is permissible. As a general rule, the quantity of acid should be limited to an amount less than that which wets the granules to a degree that the granules agglomerate to an undue extent. The extent of agglomeration is considered undue when a significant portion (i.e., greater than 10 percent) of the resultant product particles exhibit a size range in excess of that desired for the particular application. Thus, in its broadest sense, the quantity of acid employed should not cause agglomeration to the extent wherein more than 10 percent of the product particle are larger than 4 mesh. Similarly, in the production of particles within the preferred range of −8+20 mesh, agglomeration is considered undue when more than 10 percent of the resultant product particles are greater than 8 mesh. The phosphoric acid used should preferably have a $P_2O_5$ content in the range of about 25 to about 60 percent, although wide variations in the concentration of the acid are allowable. The upper level of concentration is that at which the acid becomes too viscous to be evenly distributed on the pebble surface. This concentration will vary with the amounts of impurities present in the acid. There is no lower limit to acid concentration, although of course as the acid concentration decreases, larger total volumes of liquid and longer contact times become necessary.

The pebble and acid may be contacted in any suitable manner. However, it has been found that spraying the pebble with the acid while it is being conveyed through a pugmill gives excellent results. Another contemplated mode of contact is the spraying of acid onto the pebble as it is conveyed to a drier. In a preferred embodiment of the invention, the pebble is sprayed in a pugmill, dried, recycled to the pugmill, dried, recycled a second time, and then finally dried. The recycle steps are not however necessary to the functioning of the process and good results may be obtained in a one step process without recycling. As a result of treatment according to the invention, phosphate rock having a BPL value too low to be suited for use in conventional fertilizer production may be used. As a consequence of the layered structure of the resultant product; when the particles are applied to the soil there is first released from the outer surface a quantity of phosphate which is immediately available to sustain the growing plant during the period required for the actions of soil solutions, bacteria, and root system exudates to solubilize and later release the phosphate from the intermediate layer and finally from the kernel of the particle. Since the product is in granular rather than finely pulverulant form, it is suitable for aerial application. The invention is further illustrated by the following non-limiting examples.

EXAMPLE 1

Dried pebble phosphate rock from Florida screened to pass 8 mesh U.S. series, was found by analysis to contain 29.6 percent total $P_2O_5$. This pebble, 190 grams, was placed in an inclined rotating pan and tumbled, while 10 grams of wet-process phosphoric acid analyzing 36 percent total $P_2O_5$ was sprayed onto the surface of the pebble. A gas burner was placed under the rotating pan to heat the tumbling contents until the surface of the pebble appeared dry. The product of this and subsequent examples was analyzed by A.O.A.C. methods and found to contain 31.0 percent total $P_2O_5$. Of the total $P_2O_5$, 24.5 percent was available and 6.2 percent was water soluble.

EXAMPLE 2

Pebble identical with that used in Example 1 was treated as in Example 1, except in proportions of 180 grams of pebble to 20 grams of acid. The product contained 31.5 percent total $P_2O_5$. Of the total $P_2O_5$, 32.9 percent was available and 12.8 percent was water soluble.

EXAMPLE 3

The same materials as in Example 1 were used in proportions of 170 grams of rock to 30 grams of acid. Before all of the acid had been added, the pebble surfaces were sufficiently wet to cause the tumbling action to cease. The mixture was dried, and the remaining acid applied, and the mixture again dried. Some of the solubilized pebble surface adhered to the rotating pan, causing the analyses in this case to be not directly comparable to Examples 1 and 2. The product was found to contain 31.9 percent total $P_2O_5$. Of the total $P_2O_5$, 28.9 percent was available, and 20.1 percent was water soluble.

EXAMPLE 4

Damp pebble rock phosphate containing, on a dry basis, 28.1 percent $P_2O_5$ was treated in a pugmill by spraying with a sludge-containing wet-process phosphoric acid, analyzing 36.6 percent $P_2O_5$, until the surface appeared wet. After this initial spray treatment, the pebble was dried and sprayed a second time. The product was found to contain 31.1 percent total $P_2O_5$, of which 27.8 was available and 17.0 percent was water soluble. This material was subjected to a third spraying with acid until visibly wet, and again dried. The third uptake of acid was small. The dried product contained 31.1 percent total $P_2O_5$, of which 28.2 percent was available and 17.4 percent was water soluble.

EXAMPLE 5

Corn was planted for four successive crops in a Lloyd silty clay loam, pH 6.0, fertilized with the same rates of nitrogen and potassium, but varying rates of phosphate from several sources to test the relative effectiveness of the phosphate sources. In the table given below, growth responses to pulverulant native phosphate rock and to the granular product from Example 4 are compared to the index value of 100 assigned to pulverized triple superphosphate.

| | \multicolumn{6}{c}{$P_2O_5$ Application Rate, lbs/acre} | | | | | |
|---|---|---|---|---|---|---|
| | 100 | | 200 | | 400 | |
| Crop | Rock[a] Powder | Granular[b] Product of Ex. 4 | Rock[a] Powder | Granular[b] Product of Ex. 4 | Rock[a] Powder | Granular[b] Product of Ex. 4 |
| 1 | 44 | 51 | 52 | 52 | 60 | 79 |
| 2 | 84 | 84 | 80 | 80 | 82 | 80 |
| 3 | 85 | 87 | 85 | 85 | 88 | 90 |
| 4 | 89 | 84 | 90 | 86 | 88 | 86 |

(a) - size range . . . 90% finer than 200 mesh
(b) - size range . . . Substantially −8+20 mesh These growth data show that by practice of the invention, a conveniently applied product within the prescribed size range gives sustained plant growth response comparable to that of finely powdered phosphate rock. The above table also shows that for crop No. 1, the instant product provided a growth response superior to that of the powdered phosphate rock. This reflects the presence of immediately available phosphate on the surface of the granular product.

I claim:

1. In the method for providing phosphate nutrients to soils, wherein slow release fertilizer particles are applied to the soil,
the improvement which comprises employing slow release particles substantially all of which fall within the size range −4+28 mesh, said particles having been produced from rock phosphate granules, at least 80 percent of which are larger than 28 mesh but not more than 10% of which are of a size greater than 4 mesh, and acidulating said granules with a phosphoric acid bearing solution in an amount ranging from 2.5 to 10 percent of the stoichiometric amount required to transform the apatite in said granules to monocalcium phosphate, the $P_2O_5$ concentration of said solution being no greater than about 60 percent, but at least sufficient so that the quantity of acid employed is less than that by which the granules will agglomerate to an undue extent, drying the acidulated granules and recycling the dried granules to at least one more contact cycle comprised of acidulation and drying whereby said contact cycles are sufficient to significantly upgrade the portion of $P_2O_5$ in said granules which is available phosphate, so as to produce a particle having from about 15 to about 45 percent of the total $P_2O_5$ in citrate soluble form.

2. The method of claim 1, wherein said particles are applied to the soil from an airborne conveyance.

3. The method of claim 1, wherein the amount of acid employed is at least 5 percent of said stoichiometric amount.

4. The method of claim 3, wherein said granules are phosphate pebble having a total $P_2O_5$ content of about 25 to about 32 percent and the $P_2O_5$ concentration of said solution is at least 25 percent.

5. The method of claim 4, wherein substantially all of said particles fall within the range −8+20 mesh.

6. The method of claim 5, wherein said particles are applied to the soil from an airborne conveyance.

* * * * *